United States Patent
Oswald (10) Patent No.: US 10,113,757 B2
(45) Date of Patent: Oct. 30, 2018

(54) VENTILATION DEVICE FOR CLEAN ROOM APPLICATIONS

(71) Applicants: DALDROP + DR. ING. HUGER GMBH & CO. KG, Neckartailfingen (DE); Josef Oswald, Neckartailfingen (DE)

(72) Inventor: Josef Oswald, Neckartailfingen (DE)

(73) Assignee: R. Stahl Schaltgerate GmbH, Waldenburg (DE)

( * ) Notice: Subject to any disclaimer, the term of this patent is extended or adjusted under 35 U.S.C. 154(b) by 797 days.

(21) Appl. No.: 14/377,527

(22) PCT Filed: Nov. 14, 2012

(86) PCT No.: PCT/EP2012/072618
§ 371 (c)(1),
(2) Date: Aug. 8, 2014

(87) PCT Pub. No.: WO2013/117254
PCT Pub. Date: Aug. 15, 2013

(65) Prior Publication Data
US 2015/0011153 A1    Jan. 8, 2015

(30) Foreign Application Priority Data

Feb. 10, 2012 (DE) .................... 20 2012 100 465 U (51) Int. Cl.
*F24F 7/007* (2006.01)
*F24F 3/16* (2006.01)
(Continued)

(52) U.S. Cl.
CPC .............. *F24F 3/16* (2013.01); *F24F 1/0007* (2013.01); *F24F 3/161* (2013.01); *F24F 7/007* (2013.01);
(Continued)

(58) Field of Classification Search
CPC .. F24F 3/16; F24F 1/0007; F24F 3/161; F24F 7/007; F24F 11/0001; F24F 11/0012; F24F 11/0079
(Continued)

(56) References Cited

U.S. PATENT DOCUMENTS 3,782,628 A * 1/1974 Beaudet .............. F28D 21/0008
                                                         123/142.5 R
3,823,870 A * 7/1974 Chandler .................. F24F 1/01
                                                              236/49.3
(Continued)

FOREIGN PATENT DOCUMENTS

DE      19845343 A1 *  4/2000   ............ F24F 1/0007
FR      2961294 A1  * 12/2011   ............ F24F 1/0011

Primary Examiner — Gregory Huson
Assistant Examiner — Frances F Hamilton
(74) Attorney, Agent, or Firm — Leydig, Voit & Mayer, Ltd.

(57) ABSTRACT

A ventilation device for supplying air to a clean room having a passage duct (16) with a waste air inlet (13) for receiving waste air form the room and a supply air outlet (14) for discharging supply air (34) to the room. A speed controllable rotatable fan (49) is provided in the passage duct (16) for conveying air from a suction chamber (47) coupled to the waste air inlet (13) to a pressure chamber (48) coupled to the supply air outlet (14). An outside air duct (22) is provided for receiving outside air (27) which is emitted into the passage duct (16), and an exhaust air duct (28) is provided for receiving a part of the waste air (32) extracted from the room for exhaust to the outside. First and second air flow regulators (36, 37) are provided in the respective air ducts (22, 28), and a control unit (68) is provided for controlling operation of the air flow regulators (36, 37) and the rotational speed of the fan (49).

15 Claims, 4 Drawing Sheets

(51) Int. Cl.
  *F24F 11/00* (2018.01)
  *F24F 11/30* (2018.01)
  *F24F 11/77* (2018.01)
  *F24F 1/00* (2011.01)
  *F24F 110/10* (2018.01)
  *F24F 110/60* (2018.01)
  *F24F 110/40* (2018.01)

(52) U.S. Cl.
  CPC .......... *F24F 11/0001* (2013.01); *F24F 11/30* (2018.01); *F24F 11/77* (2018.01); *F24F 1/0018* (2013.01); *F24F 2001/0051* (2013.01); *F24F 2110/10* (2018.01); *F24F 2110/40* (2018.01); *F24F 2110/60* (2018.01); *Y02B 30/746* (2013.01); *Y02B 30/78* (2013.01)

(58) Field of Classification Search
  USPC .......................................................... 454/187
  See application file for complete search history.

(56) References Cited

U.S. PATENT DOCUMENTS

| | | | | |
|---|---|---|---|---|
| 4,068,802 A * | 1/1978 | Goings | ................ | B05B 7/0075 239/419.5 |
| 4,178,159 A * | 12/1979 | Fecteau | ................ | F24F 13/28 454/296 |
| 5,029,518 A * | 7/1991 | Austin | ................ | F24F 3/161 454/185 |
| 5,450,894 A * | 9/1995 | Inoue | ................ | B60H 1/00285 165/43 |
| 5,518,451 A * | 5/1996 | Renz | ................ | F24F 3/161 181/225 |
| 5,626,820 A * | 5/1997 | Kinkead | ................ | A61L 9/046 422/122 |
| 6,076,739 A * | 6/2000 | Littleford | ................ | F24F 3/044 165/222 |
| 6,358,139 B1 * | 3/2002 | Renz | ................ | F24F 1/0007 454/187 |
| 6,514,137 B1 * | 2/2003 | Panelli | ................ | F24F 3/161 169/54 |
| 7,765,072 B2 * | 7/2010 | Eiler | ................ | F24F 3/16 702/31 |
| 7,878,236 B1 * | 2/2011 | Breen | ................ | F24F 11/008 165/288 |
| 7,891,573 B2 * | 2/2011 | Finkam | ................ | F24F 11/001 236/1 C |
| 7,942,193 B2 * | 5/2011 | Caldwell | ................ | F24F 12/006 165/54 |
| 8,186,132 B2 * | 5/2012 | Howery, Jr. | ................ | E04B 1/08 52/262 |
| 8,583,289 B2 * | 11/2013 | Stack | ................ | F24F 11/0009 165/121 |
| 8,939,826 B2 * | 1/2015 | Zorzit | ................ | F24F 1/0007 454/237 |
| 2007/0205297 A1 * | 9/2007 | Finkam | ................ | F24F 11/001 236/1 C |
| 2008/0185446 A1 * | 8/2008 | Tozer | ................ | H05K 7/20745 236/49.4 |
| 2009/0277122 A1 * | 11/2009 | Howery, Jr. | ................ | E04B 1/08 52/696 |
| 2010/0159818 A1 * | 6/2010 | Sakashita | ................ | F24F 13/28 454/233 |
| 2013/0017774 A1 * | 1/2013 | Zorzit | ................ | F24F 1/0007 454/239 |
| 2013/0052936 A1 * | 2/2013 | Jordan | ................ | F24F 13/14 454/338 |

* cited by examiner

VENTILATION DEVICE FOR CLEAN ROOM APPLICATIONS

FIELD OF THE INVENTION

The present invention relates to a ventilation device for supplying and extracting air from a room, in particular a clean room.

BACKGROUND OF THE INVENTION

Clean rooms of this type, to which the present invention relates in particular, are used predominantly in the fields of pharmaceutics, biotechnology and microelectronics. Operations or production processes must be performed in clean rooms in closed spaces under controlled conditions. Depending on the application and requirements related thereto, various parameters such as, e.g., air temperature, air humidity, room pressure, particle and germ count can be influenced or controlled in a targeted manner in such clean rooms. Depending on the required degree of purity, excess pressure or negative pressure in the clean room, different clean room classes have been known and standardized.

In order to maintain one or several of the aforementioned parameters in a clean room, special ventilation systems are used. Despite occurring disturbances such as, e.g., thermal, humidity and substance loads, said ventilation systems must ensure that prespecified parameter values be maintained.

In practical settings, ventilation systems for clean rooms have been known in various configurations. Generally, these are systems with several functional units that, e.g., are installed in an intermediate ceiling area above a clean room, e.g., on walkable clean room ceiling, and are connected to each in accordance with flow technology. In most cases, there is a fan-and-filter unit that comprises a ventilation device and, e.g., a particulate air filter in order to introduce clean air through a supply duct into the clean room. The clean air is introduced in the room at a relatively high flow rate in order to allow a very high air exchange as needed. Some systems allow an air exchange of up to 400 times per hour, thus requiring appropriately high flow rates. With the use of another unit that also may comprise an air filter, used waste air is removed from the clean room. In most cases, this waste air removal unit is fluidically connected to an air processor that suitably conditions the exhaust air and mixes it, in particular, with fresh outside air in order to provide conditioned, clean air for the fan-and-filter unit. Furthermore, a cooler or heater for the thermal treatment of the ingoing air to be supplied to the clean room may be provided.

All of these functional units are connected to each other by means of a branched duct network that conveys the individual air flows. The volume flows are regulated with the aid of control valves arranged distributed in the duct system and by control of the ventilating devices, ensuring the air transport. To accomplish this, a controller that is separate from and imposed on the functional units is provided, said controller monitoring and regulating the prespecified parameters in the clean room such as temperature, pressure, etc., with the aid of associate sensors and a logic control.

The design of such a ventilation system is complex in that it requires considerable space for the different functional units, the duct network, the sensors and the control system. In addition, the expenses for installation and startup are relatively high due to the numerous connections between connectors that need to be provided, the relatively complex preliminary wiring and preliminary specification of parameters. Also, the maintenance and servicing of such a distributed system is difficult. During operation, problems can occur when adapting the functional units to each other and when regulating them.

Also, so-called "fan-filter units" have been known, these forming a combined unit of a fan and a particulate air filter as well as, potentially, a cooler that can be installed in the ceiling of a room. Such circulated air devices simplify the design of a ventilation system to the extent that they ensure the introduction of ingoing air into the room as well as the removal of the waste air by using a single circulated air device. The supply of outside air, however, occurs in a separate air conditioner that is fluidically connected to the circulated air device. Furthermore, the volume flow controllers and their associate intelligent features for control, monitoring and energizing are arranged outside the circulated air device, this potentially being related to the aforementioned inadequacies or disadvantages.

There is the desire of further combining the different functional units in order to create highly compact, integrated ventilation devices that are able to reduce the expenses for installation, startup and maintenance. However, due to the different applications, specifications and required degrees of purity, different clean rooms pose different requirements for supplying and extracting air. Furthermore, changing production processes and clean room equipment may also pose different requirements for air supply and air extraction. To this extent, it appears difficult to provide a universal compact device for the supply and extraction of air in clean rooms, whereby said device would be able to satisfy such varied requirements.

OBJECTS AND SUMMARY OF THE INVENTION

Considering the foregoing, it is the object of the present invention to eliminate or minimize the aforementioned inadequacies of conventional ventilation systems for clean rooms and provide the most compact possible, integrated ventilation device that is suitable for clean room applications. In particular, it is an object of the present invention to provide a compact ventilation device that is able to satisfy different requirements for the supply and extraction of air in different clean rooms, depending on use, specifications and purity classes. In doing so, the ventilation device having a simple design should allow a simple installation, maintenance and startup, as well as a simple operation of the ventilation device.

In accordance with the invention, an improved ventilation device is provided that is specifically intended for supplying air to and extracting air from a clean room. The device has a housing that defines an interior space in which different components are arranged. In a particular embodiment, in the interior, a passage duct is provided that extends from a waste air inlet provided on the housing through the interior to a supply air outlet provided on the housing, the latter being disposed for supplying air to the room. Furthermore, a fan is provided in the interior, said fan being arranged in the passage duct in order to convey air from a suction-side chamber fluidically connected to the waste air inlet to a pressure-side chamber fluidically connected to the supply air outlet. Furthermore, provided in the interior there is an outside air duct that is fluidically connected to an outside air connection on the housing in order to take up air, and that comprises an outside air outlet in order to emit outside air into the passage duct. Furthermore, provided in the interior is an exhaust air duct that has an exhaust air inlet fluidically connected to the passage duct in order to receive a part of the waste air discharged from the room as exhaust air and an exhaust air connection provided on the housing in order to convey the received exhaust air out of the housing to the outside. In accordance with an embodiment of the invention, the rotational speed of the fan in the passage duct is controllable. Furthermore, installed in the outside air duct is a first volume flow regulator, and installed in the exhaust air duct is a second volume flow regulator. A control unit is configured so as to control the operation of the first and the second volume flow regulators and to control the rotational speed of the fan, as required.

Consequently, a universal, compact ventilation device is provided, said device combining the speed-controllable fan for the conveyance of supply air, the outside air duct for admixing fresh outside air and the exhaust air duct for the simultaneous extraction of room air as exhaust air in a space-saving flow-enhancing arrangement. With the integrated volume flow regulators and the control unit comprising the necessary intelligent features for monitoring, regulation and control of all functional units of the ventilation device, the ventilation device is capable of satisfying and maintaining different requirements for clean rooms such as purity classes and pressure conditions.

The ventilation device preferably comprises an elongated housing having the shape of a parallelepiped and an upper side, an underside, a first and a second longitudinal side that are opposite each other and connects the upper side with the underside, wherein the upper side, the underside and the longitudinal sides are closed toward the outside. The remaining opposing narrow sides of the housing are at least partially open and form the air inlet and the supply air outlet so that the passage duct extends in longitudinal direction of the housing between these narrow sides.

In a preferred embodiment, the housing comprises a sturdy bearing frame structure that, preferably, consists of a light-weight metal such as, e.g., aluminum in order to minimize the weight of the ventilation device. Furthermore, the housing has housing covers that form a sealing enclosure at least on the upper side and the longitudinal sides of the ventilation device. The housing covers consist of material that is suitable for clean rooms, preferably high-pressure compression molded layered panels that consist of layers of wood-based fibers impregnated with thermohardening resins and potentially having a surface coating, and that—in any event—are sufficiently durable, abrasion-resistant and corrosion-resistant and do not release harmful gasses or dust. The housing covers can be fastened to the light-metal profiles by screwed connections. Sealing profiles set in the housing covers are disposed to seal the interior relative to the outside in an airtight manner.

Preferably, an inflow fan is centrally mounted in a dividing wall that extends transversely to the passage duct and separates the suction-side chamber from the pressure-side chamber. The inflow nozzle is oriented in the passage duct facing the inflowing waste air, i.e., is oriented opposite the direction of flow of the supply air in the passage duct.

The fan comprises a speed-controlled drive arrangement that, preferably, is an EC motor, i.e., a brushless, electronically commutated direct-current motor. In one embodiment, the fan is a single-direction sucking, motor-driven radial flywheel without spiral housing, optimized by a special, rearward curved, profiled shovel design with rotating diffusor for low energy consumption, a high degree of efficacy and favorable acoustic behavior. The driving motor is operationally coupled with the control unit that continuously regulates the motor's rotational speed in order to achieve and maintain a prespecified volume flow of supply air. By means of the rotational speed control, independent of the quality and/or the degree of contamination of any filter for suspended particles that may be provided on the waste air inlet and/or the supply air outlet, it is possible to keep the volume flow in the passage duct constant. In one embodiment, the amount of air volume can be adjusted so as to be variable between 0 and 6000 m3/h, wherein the nominal air volume of the fan is approximately 4200 m3/h. As a result of this, a very high air exchange of even several hundred times per hour is possible, depending on the size of the room.

In order to be able to exactly control the required supply air volume, the ventilator further comprises a measuring unit for measuring a value that characterizes the volume flow conveyed through the fan, wherein the measuring unit communicates with the control unit. In doing so, the measuring unit delivers the measuring signals characterizing the volume flow to the control unit that continuously regulates the rotational speed of the fan based on the detected measuring signals. The measuring unit may be integrated in the form of a differential pressure sensor in the inflow nozzle of the fan.

The outside air duct and the exhaust air duct are preferably pipes that are arranged in the vicinity of the waste air inlet of the ventilation device, that extend transversely through the passage duct and preferably parallel to each other and, depending on the installation of the device, are arranged on top of each other or next to each other. The pipes may have a diameter of, e.g., up to 25 cm or even more in order to be able to satisfy another requirement range for admixing outside air and/or for removing waste air in communication with the integrated volume flow regulators.

In a particularly preferred embodiment of the invention, the outside air outlet and the exhaust air inlet are disposed and arranged in such a manner that, with the simultaneous discharge of the exhaust air and the admixing of outside air, there will be no short-circuiting of the air flows. Therefore, the outside air cannot escape from the outside air outlet directly into the exhaust air inlet. Flow losses of the outside air are thus prevented. The supply and admixing of conditioned outside air to supply people in a clean room with fresh air or to use it as replacement for optionally existing process exhaust air can take place with great efficiency and precision. Likewise, without a short-circuiting of the air flows, it is possible to discharge the exactly prespecified volume of exhaust air from the device toward the outside, without being again supplied to the room.

In a preferred embodiment, the outside air outlet is a first perforation in a wall of a pipe forming an outside air duct, and the exhaust air inlet is a second perforation in a pipe forming the exhaust air duct. The first and the second perforations extend over a circumferential range of the respective pipe that is smaller than 180°. In order to avoid a short-circuiting of the air flows, the first and the second perforations are oriented in opposite directions in longitudinal direction of the passage duct. More precisely, the outside air outlet faces in the flow direction of the air in the passage duct, whereas the exhaust air inlet is oriented in the direction against the flow direction. The number and the total area of perforation openings is defined suitably in order to be able to remove a certain maximum portion of exhaust air or to be able to admix said portion to the outside air. The pipes for the outside air duct and the exhaust air duct with their integrated perforations are arranged in a flow-enhancing manner in order to prevent major disruptions of the exhaust air flowing in the passage duct, as well as flow turbulences.

For regulating the volume flows of the admixed outside air and the discharged exhaust air, each of the first and the second volume flow regulators comprises a variable flow limiting device, preferably an adjustable butterfly valve, in the outside air duct or the exhaust air duct, wherein an actuator or a servo mechanism is provided for actuating the respective flow limiting device or butterfly valve. The actuator is operationally coupled with the control unit in order to receive actuating signals from the control unit in order to, e.g., suitably adjust the butterfly valve for a prespecified volume flow. In order to allow a precise regulation, preferably a differential pressure sensor is provided in the respective duct, said sensor detecting the pressure characterizing the respective volume flow and delivering the respectively detected measured values to the control unit.

The ventilation device in accordance with the invention may further comprise a cooling/heating unit for appropriately thermally treating the supply air before it is being supplied to the room. Preferably, the cooling/heating unit is arranged in the passage duct downstream of the fan.

In one embodiment, the cooling/heating unit comprises a heat exchanger for cooling/heating with a preferably liquid heat transfer medium, preferably a water/air heat exchanger that is connected to forward flow and reverse flow connections located on the housing.

For regulating the flow of the heat transfer medium, in particular water, a regulating valve is arranged in the forward flow or the reverse flow of the heat exchanger. The regulating valve is actuated, for example by means of an actuator that can be energized by the control unit. A ventilation device configured in this manner thus allows the regulation of the supplied supply air and thus the room temperature.

For a precise regulation of the room temperature, the cooling/heating unit is preferably associated with a temperature feeler that, preferably, is also integrated in the ventilation device and arranged in the passage duct in order to detect the temperature of the waste air. The measured temperature values are output to the control unit that comprises a suitable logic control in order to suitably energize the actuator of the regulating valve based on the detected measured temperature values for regulating the room temperature. In doing so, it is possible to also be able to precisely condition the temperature of the room in addition to the volume flows and hence the pressure conditions.

The ventilation device preferably comprises a data interface for data input and also comprises storage means for storing nominal parameter values for the control unit, these including the nominal values for the volume flow of the supply air, the room temperature, the outside air volume to be admixed and the exhaust air volume to be discharged. The control unit uses the prespecified nominal parameter values for regulating the respective volume flows as well as the room temperature.

Optionally, a nominal value for the pressure in the room to be ventilated may also be prespecified, and the control unit may be set up for controlling the volume flow regulator and for controlling the fan in order to achieve the prespecified nominal room pressure value. In this case, a pressure sensor may be installed in the device, the sensor tube of said sensor leading to the room and, for example, being connected to the control unit via the data interface in order to deliver momentary measured values of the room pressure.

The ventilation device in accordance with the invention may comprise additional means that support the desired air-conditioning of a room, in particular a clean room, such as, e.g., filter means, in particular filters for suspended particles, for filtering out dust particles and other solid particles from the discharged exhaust air and/or from the introduced supply air. Furthermore, the control unit may disposed for monitoring the filter contamination of upstream or downstream filters, e.g., by monitoring existing pressure conditions. Advantageously, the control unit is able, independent of the degree of contamination of such air filters, to precisely maintain the prespecified air volumes that are to be supplied or discharged by means of the internal regulating circuits in the ventilation device.

The control unit may also be adapted for other tasks such as, for example, a lock control for personnel and/or material locks, including a reciprocal door lock, indicator lamp display, emergency function and optional incorporation of an access control for access to a room. As a result of this, the field of applications of the compact ventilation device can be further enlarged.

For larger rooms, several appropriate ventilation devices maybe provided and operated in parallel. For the exchange of data, the devices may be connected to each other by data busses. They may operate based on a master-slave configuration. The ventilation devices may also be connected by a data bus to a central unit and be managed centrally. This allows an expanded data storage, as well as the output of data to higher-level building automation system. The control unit of the ventilation devices is preferably set up with suitable standardized industrial bus protocols that support a communication with other devices and/or a central unit.

Other objects and advantages of the invention will become apparent upon reading the following detailed description and upon reference to the drawings, in which:

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Figure 1:
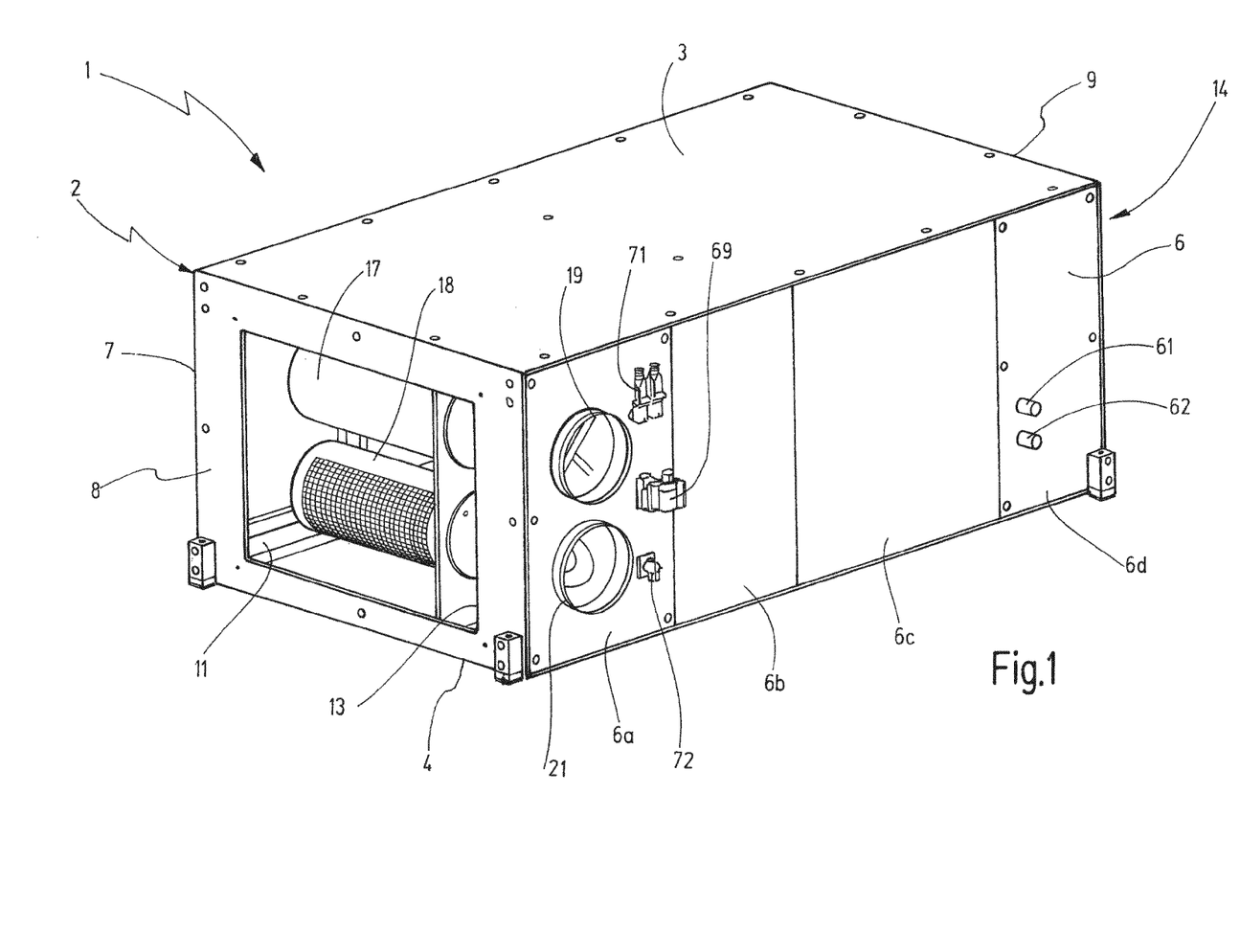
FIG. 1 is a perspective of a ventilation device in accordance with the invention for supplying air to and extracting air from a room, in particular a clean room.

Referring now more particularly to FIG. 1 of the drawings, there is shown an illustrated ventilation device for supplying air to and extracting air from a room, in particular a clean room in accordance, with a preferred embodiment of the invention. The ventilation device 1 comprises a housing 2 having the shape of an elongated parallelepiped having an upper side 3, an underside 4, two longitudinal sides 6, 7, and two narrow sides 8, 9. However, it is understood that the ventilation device need not necessarily be used in the depicted horizontal position but may also be used in a vertical position, e.g., with the narrow side directed upward.

The housing sides 2 to 9 are represented by the housing covers that are mounted to a bearing frame structure 11 fastened with screws so as to create a seal. The frame structure 11 that is constructed in this case with a durable but light-weight design of extruded aluminum profiles, is indicated in FIGS. 1 and 2.

The housing covers 3, 4, 6 to 9, consist of high-pressure compression molded layered panels having a thickness of, for example, 10 mm, the layers being manufactured of layers of wood-based fibers with a highly durable surface, e.g., of melamine resin. The panels do not need any protective painting or seals, do not corrode, and do not release harmful gasses or dust. They are durably resistant to chemical and disinfectants and, due to their specific material properties and their favorable processing options, satisfy all the requirements for use in clean rooms.

Figure 2:
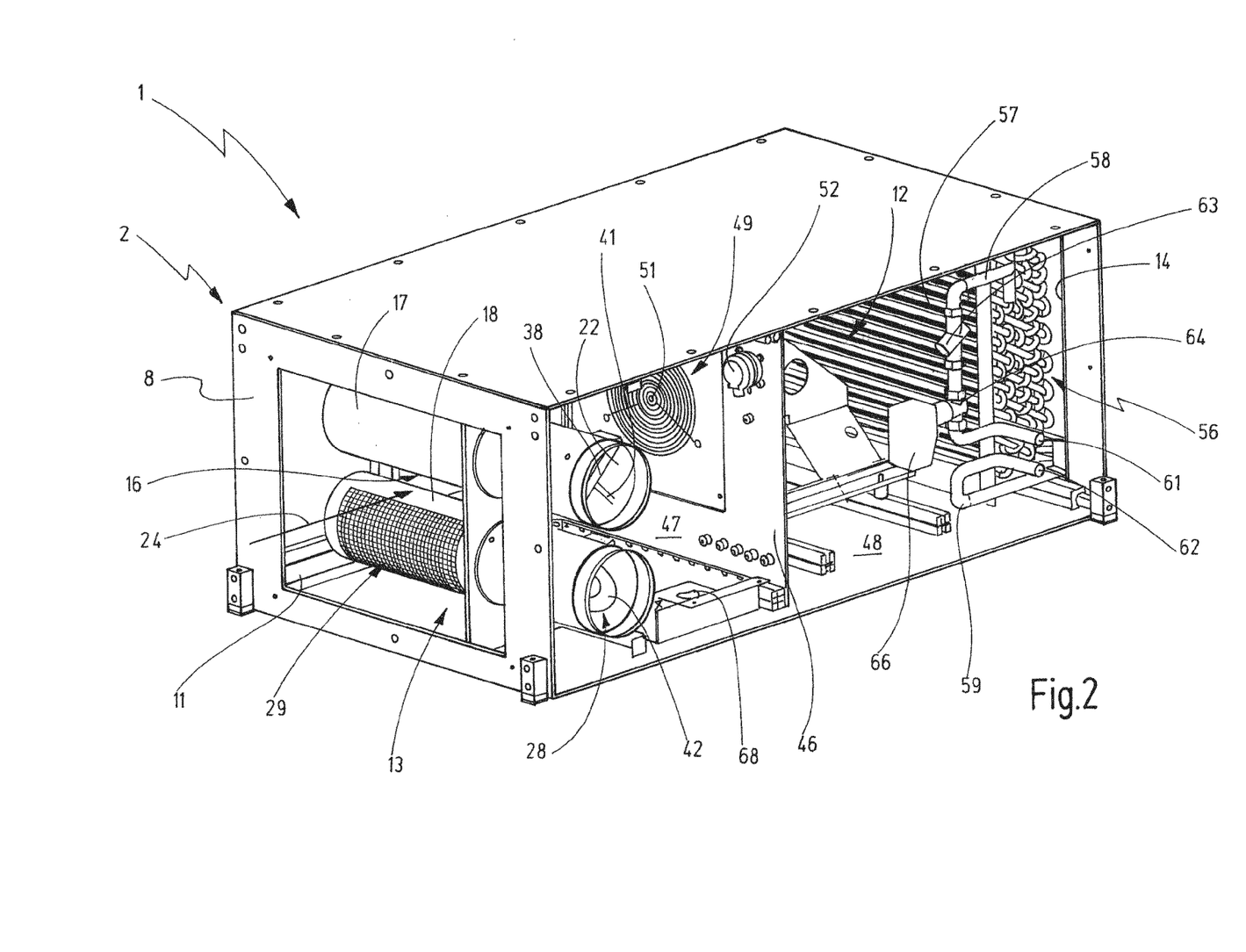
FIG. 2 is a perspective of the ventilation device shown in FIG. 1 with the lateral housing covers removed in order to allow a view of the interior of the ventilation device.

As depicted in FIGS. 1 and 2, the housing covers forming the upper side 3 and the underside 4 are made of continuous panels that form a closed wall. Likewise, the housing cover 7 that represents the rear longitudinal side facing away from the viewer in the Figures is formed by a continuous closed wall. The housing cover located on the opposite longitudinal side 6 comprises several adjoining wall elements 6a-d that can be detached individually in order to provide access to the individual regions of the interior 12 defined by the housing 2. Passed through the housing cover 6 are several pneumatic, electrical and hydraulic connections that are described in greater detail, hereinafter, in conjunction with the description of the mineral components of the ventilation device 1.

The housing cover 8 on the narrow side of FIGS. 1 and 2 facing the viewer has the shape of a rectangular frame that essentially covers only the profiles of the frame structure 11 located behind it and delimits a central inlet opening 13 leading into the interior 12. The inlet opening 13 acts as the waste air inlet in order to remove the waste air from the room, to which air is to be supplied and from which air is to be exhausted. Depending on the place of use, a line not shown here, may be connected to the waste air inlet 13, whereby said line may be connected to outlet openings provided at suitable locations of the room in order to remove waste air from the room and convey it to the ventilation device 1.

The housing cover 9 on the opposite narrow side 9 of the housing 2, said side facing away from the viewer in FIGS. 1 and 2, is configured in a similar manner as the housing cover 8 in the form of a rectangular frame that delimits an outlet opening that is not shown in greater detail here, said outlet opening connecting the interior 12 to the outside of the device. The outlet opening acts as the supply air outlet for supplying the ventilated room with supply air. Depending on the place of use, a supply air outlet 14 may be connected by means of lines that are not specifically illustrated here to one suitable inlet opening or several inlet openings that leads or lead to the ventilated room. A passage duct 16 extends from the inlet opening 13 to the outlet opening 14 in longitudinal direction of the ventilation device 1 through the entire interior 12 for conveying return air.

Figure 3:
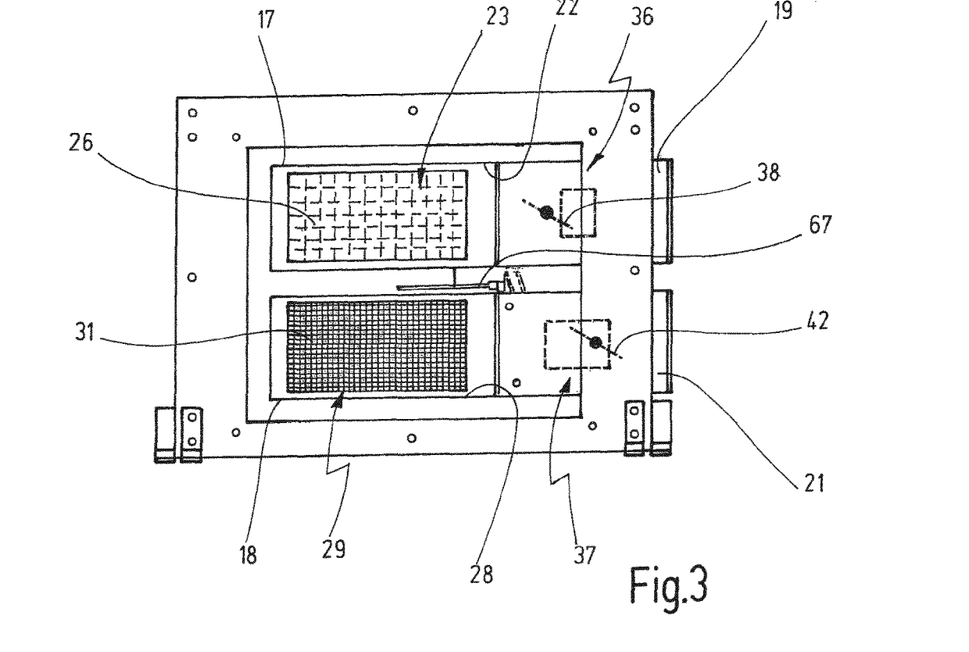
FIG. 3 is a plan view from the front of a waste air inlet of the illustrated ventilation device.
Figure 4:
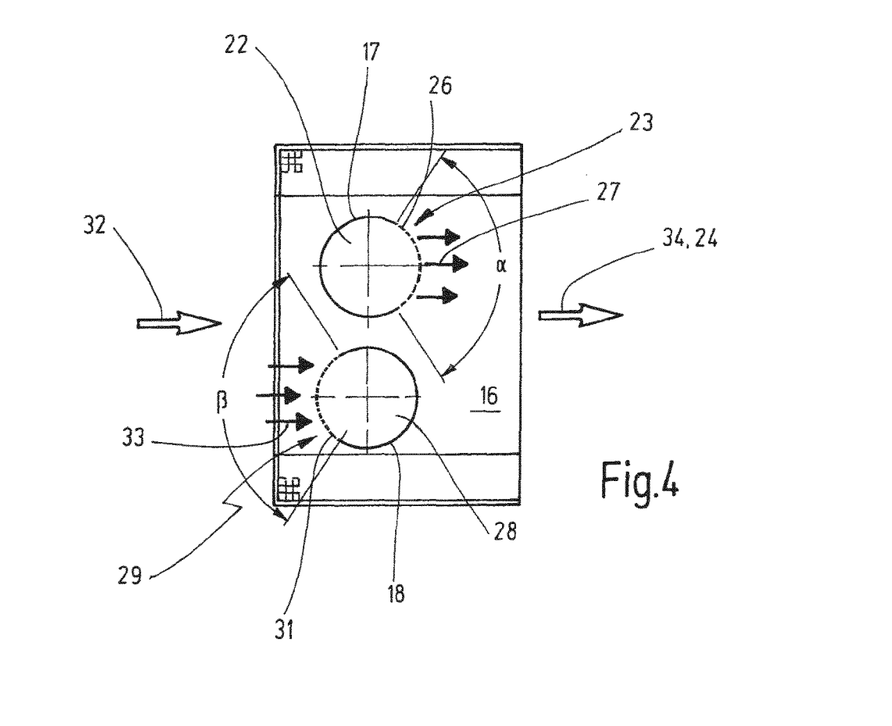
FIG. 4 is a simplified side view of an outside air outlet and an exhaust air inlet of the illustrated ventilation device.
Figure 5:
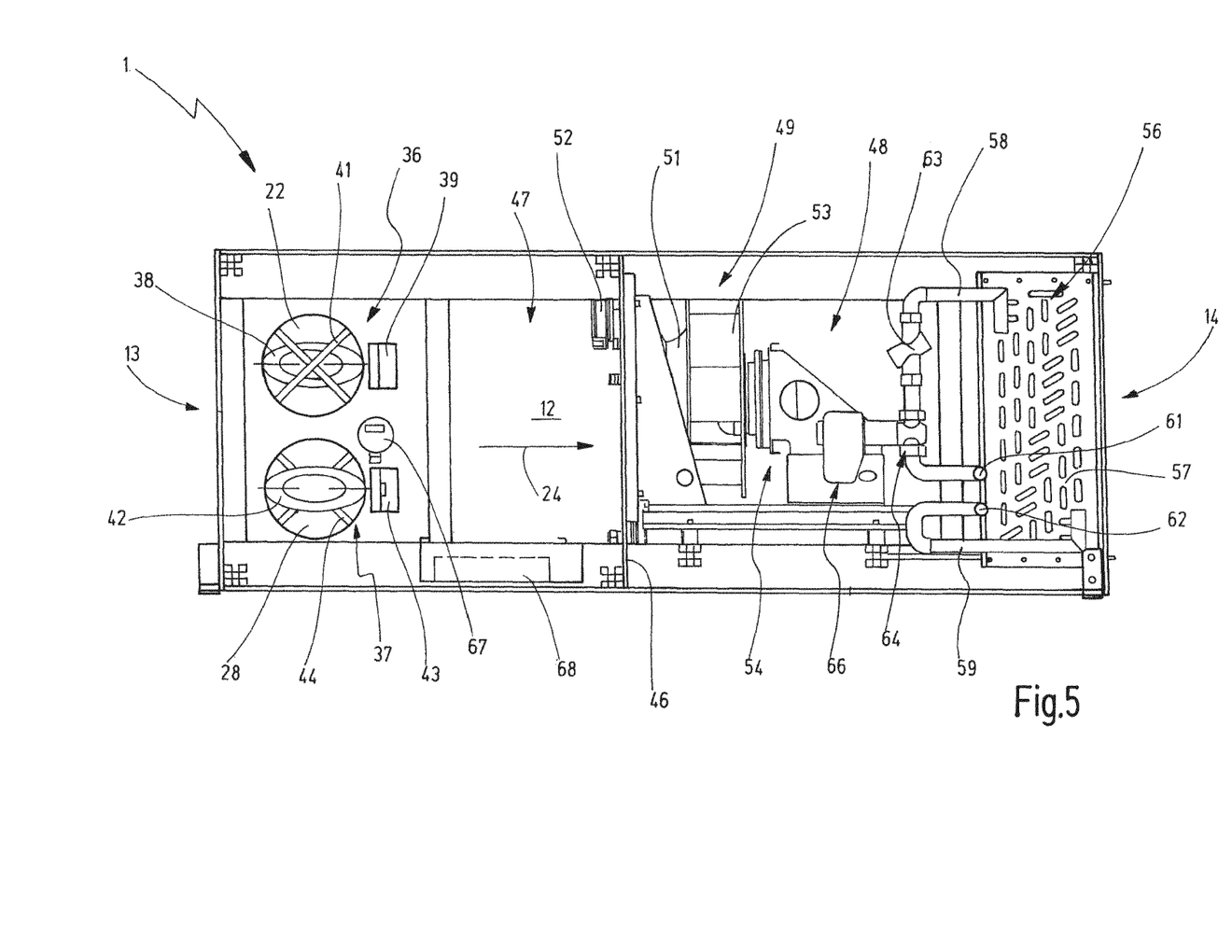
FIG. 5 is a side view of the illustrated ventilation device looking onto the longitudinal side, with the housing cover removed.

The components of the ventilation device 1 arranged in the interior 12 are depicted in FIG. 2, which shows the ventilation device 1 with the housing cover 6 removed, and from additional details illustrated in FIGS. 3 to 5. As illustrated, the ventilation device 1 has, in the immediate vicinity of the waste air inlet 13, a first pipe 17 and a second pipe 18 that are arranged parallel to each other—in the present case above each other—and transversely to the longitudinal or extension direction of the passage duct 16. The first and the second pipes 17, 18, are connected to associate first and second connections 19, 21, arranged on the outside on the wall element 6a of the housing cover 6.

The first pipe 17 is disposed for admixing outside air as fresh air to the discharged waste air. In doing so, it has or is connected to an outside air duct 22 that has circular-cylindrical form, said duct being fluidically connected to the first or outside air connection 19 in order to take up outside air, and leading to an outside air outlet 23 illustrated in greater detail by FIGS. 3 and 4, in which case the outside air is discharged in the passage duct 16. As can be seen, the outside air outlet 23 is arranged on the side of the first pipe 17 facing away from the waste air inlet 13 in such a manner that it is oriented in a flow direction indicated by arrow 24 in FIG. 4 along the passage duct 16.

More precisely, the outside air outlet 23 is restricted to a region delimited in longitudinal direction and circumferential direction of the first pipe 17, said region being located on the downstream side of the first pipe 18 so that the outside air leaving through the outside air outlet 23—apart from a vertical component—can leave only with a horizontal flow component pointing in downstream direction 24. With reference to the depicted circular cross-sectional form of the first pipe 17 and the angle of aperture $\alpha$ of the outside air outlet, said opening is symmetrical relative to a horizontal plane extending through a center of the outside air duct 22, is less than 180°, preferably less than 140°, however preferably more than approximately 90°, as indicated in FIG. 4. In the illustrated exemplary embodiment, the angle of aperture $\alpha$ is approximately 110°.

The outside air outlet 23 can be configured as an aperture in the first pipe 17. As depicted in FIGS. 3 and 4 in the preferred embodiment shown here, the outside air outlet is in the form of a perforated region 26 defined by a regular arrangement or matrix of holes that extend through the wall of the first pipe 17. This perforation 26 makes it possible to blow out the outside air in the form of a low-turbulence, essentially laminar flow into the passage duct 16, as is indicated by flow arrows 27 in FIG. 4.

The second pipe 18 is an exhaust air duct 28 for discharging a part of the inflowing waste air as exhaust air, wherein the exhaust air duct 28 extends from an exhaust air inlet 29 through the second pipe 18 up to the second or exhaust air connection 21, said connection leading toward the outside through the housing cover 6. Like the outside air outlet 23, also the exhaust air inlet 29 is a perforated region 31 that is defined by a regular arrangement or matrix of holes in a section of the wall of the second pipe 18 delimited in a longitudinal direction and circumferential direction of the pipe 18. The aperture angle $\beta$ of the exhaust air inlet 29 symmetrical about a horizontal plane through a center of the exhaust air duct 28 is also smaller than 180°, preferably smaller than 140°, and preferably greater than approximately 90°, and is approximately 110° in the case here.

However, the exhaust air inlet 29 extends in a direction opposite the flow direction 24 so that said inlet faces the waste air inlet 13 and the inflowing waste air, as indicated by the flow arrow 32 in FIG. 4. Consequently, the exhaust air inlet 29 and the outside air outlet 23 are arranged on opposite sides of a vertical plane extending through the centers of the ducts 22, 28 and aligned in opposite directions so that during operation there will be no short-circuiting between the outside air flow and the exhaust air flow.

The portion of waste air that has entered the exhaust air duct 28 through the exhaust air inlet 29, said waste air being the exhaust air, is indicated by flow arrows 33 in FIG. 4. The portion of waste air 32 passed through the two pipes 17, 18, together with the admixed outside air 27, continues to flow as supply air in the flow direction 24 through the passage duct 16, as indicated by flow arrow 34 in FIG. 4.

As depicted in FIGS. 3 and 5 both the outside air duct 22 and the exhaust air duct 28 each have a volume flow regulator 36, 37. The volume flow regulator 36 for the outside air comprises a flow limiting device 38 that, in the present case, is configured as a butterfly valve disposed for variably throttling the volume flow in the outside air duct 22. For adjusting the butterfly valve 38, it is associated with an actuator 39 that is preferably provided as a controllable electromotoric servo mechanism. Furthermore, for precisely regulating the volume flow, the volume flow regulator 36 comprises a differential pressure sensor 41 that detects the differential pressure in the outside air duct 27. The differential pressure sensor 41, in this case, is a simple cost-effective measuring cross; however, other suitable measuring arrangements such as a Venturi nozzle, orifice gauge, measuring nozzle or the like could be used. The differential pressure sensor 41 outputs the detected measured pressure values to a control unit that evaluates the measured values and appropriately energizes the actuator 39 in order to suitably actuate the butterfly valve 38 in order to achieve a prespecified volume flow in the outside air duct 22. The control unit will be described in greater detail at a later point.

The volume flow regulator 37 for the exhaust air 33 also comprises a variable flow limiting device 42 that is an adjustable butterfly valve arranged in the exhaust air duct 28. The butterfly valve 42 is associated with an actuator 43 in the form of an energizable electromotoric servo mechanism 43 that pivots the butterfly valve 42. A differential pressure sensor 44 in the form of a measuring cross installed in the exhaust air duct 28 detects the pressure therein and emits the detected measured signals to the control unit.

Referring to FIGS. 2 and 5, it can be seen that, in a central region of the passage duct 16, there is arranged a dividing wall 46 that fully extends through the passage duct 12 between the upper side 3 and the lower side 4, as well as between the longitudinal sides 6 and 7. The dividing wall 46 divides the interior 12 into an upstream chamber 47 and a downstream chamber 48.

An inflow nozzle 51 is mounted in a central area of the dividing wall 46. The inflow nozzle 51 has a volume flow measuring device 52 and a ventilation fan wheel 53. The inflow side of the inflow nozzle 51 is oriented in the passage duct 16 in a direction opposite the flow direction 24 in order to take up inflowing supply air. The volume flow measuring device 52 is a static differential pressure transmitter that detects the differential pressure via the inflow nozzle 51 and delivers it to the control unit.

In the present case, the fan wheel 53 is a motor fan wheel that is driven by a drive arrangement 54 whose rotational speed can be regulated, in the present case, in particular, a brushless electronically commutated DC motor (EC motor). Preferably, the EC motor is provided with integrated electronics for commutation. The fan wheel 53 is preferably a single-direction sucking, rearward curved radial flywheel that has been optimized for the operation without spiral housing by means of a special impeller design with a rotating diffusor in order to achieve high degrees of efficacy and favorable acoustic behavior.

As is further depicted in FIGS. 2 and 5, an optional cooling/heating unit 57 for the thermal treatment of supply air to be supplied to the room is installed downstream of the fan 49 in the immediate vicinity of the supply air outlet 14. In the present case, the cooling/heating unit 56 comprises a water/air heat exchanger or another heat exchanger for cooling/heating the supply air with a preferably liquid heat transfer medium. The heat exchanger 57 is a finned heat exchanger; however, also other designs such as, for example ribbed pipe heat exchangers, can be used. In any event, the heat exchanger 57 comprises pipes 58, 59 that supply the heat transfer medium, in particular water, to the heat exchanger or remove it therefrom, and that are each connected to a forward flow connection 61 or a return flow connection 62. As can be seen in FIG. 1, the forward flow and the return flow connections 61, 62 are provided on the outside of the housing 2 in the present case on the housing cover 6d and are disposed for the connection of an external source for the heat transfer medium, in particular water.

In the pipe 58, there is a manual adjusting valve 63 with which a constant flow of the heat transfer medium can be adjusted in advance, depending on the specific requirements. In order to be able to precisely regulate the prespecified room temperature during operation as a function of environmental and operating conditions, the pipe 58 further contains a regulating valve 64 for regulating the flow of the heat transfer medium through the heat exchanger 57. The regulating valve 64 is associated with an actuator in the form of a continuously regulatable servo mechanism that appropriately adjusts the regulating valve 64 after being energized in order to achieve the desired flow of the heat transfer medium for the desired heat transfer to the passing supply air in order to suitably keep the temperature of the room air constant.

For measuring the momentary room air temperature, there is provided a room air temperature feeler 67 that, in the present case, preferably is an integral part of the ventilation device 1. As depicted in FIGS. 3 and 5, the temperature feeler 67 is arranged in the passage duct 16 downstream of the first and second pipes 17, 18 in the immediate vicinity of said pipes in order to detect the temperature of the waste air flow 32 flowing between them.

The subject ventilation device 1 is a stand-alone module that contains all the necessary hardware and software components that, by themselves, can perform the function of the ventilation device without any auxiliary devices. To accomplish this, the ventilation device 1 comprises a control unit 68 that, in the present case, preferably is a memory programmable control (PLC) that is configured or programmed and suitably wired for controlling and regulating the ventilation device 1. The control unit 68 preferably comprises a power supply unit that is connected to a mains plug 69 via an appropriate power cable provided on the outside of the housing 2—in the present case in particular on the wall element 6a (FIG. 1)—for connection to a public power supply. Furthermore, the control unit 68 preferably is connected via a data interface to a data connection 71 provided on the outside of the housing wall element 6a, said data connection 71 being disposed for the connection of a commercially available computer, PCs, laptops or the like. It is also possible to enter parameters for the operation of the ventilation device via this data interface, which parameters are then stored in a memory and allocated to the control unit 68 and are used during operation for controlling and regulating the ventilation device 1.

As previously mentioned, the control unit 68 furthermore communicates via internal wiring with the aforementioned sensors, in particular the differential pressure sensors 41, 44, the volume measuring device 52 and the temperature feeler 67 in order to obtain the actual values of the respectively measured parameters. Furthermore, the control unit 68 is electrically connected to the corresponding actuators 69, 63, 66 and the motor 54 in order to be able to energize these.

As depicted in FIG. 1, a central switch 5 in this case is provided on the outside of the housing 2 on the wall element 6a, by means of which the ventilation device can be switched on or off as needed at the time of startup, for maintenance purposes and the like.

The inventive ventilation device is particularly adapted for supplying air to and extracting air from clean rooms. Typically the device is installed in an intermediate ceiling area above a clean room. A walkable clean room ceiling may be helpful, however, it is not essential. On principle, all components of the device are maintenance-free. The device may also be installed directly in a clean room. The ventilation device 1 may come equipped with complete hardware and software and is pre-set and pre-configured at the factory so that it can be installed and started up relatively easily. In particular, all application-specific parameters such as, e.g., nominal values for volume flows for outside air that is to be admixed, exhaust air that is to be extracted and supply air that is to be supplied to the room, the volume nominal value for the heat transfer medium of the heat exchanger 37, as well as the nominal value for the room temperature and, optionally, a default value for the internal pressure of the room can be prespecified in advance at the factory so that the efforts for the startup on-site can be reduced to a minimum. However, all the parameters can later be changed at any time via the data connection 71.

For startup, the ventilation device 1 is connected to the mains supply via the mains plug 39, and the forward and return flow connections 61, 62 of the ventilation device 1 are connected to a suitable source, e.g., a cooling water source. A primary air supply with fresh outside air is connected to the outside air connection 19, and the exhaust air connection 21 is connected to an exhaust duct under negative pressure.

Depending on the installation site of the ventilation device 1, furthermore the waste air inlet 13 and the supply air outlet 14, optionally via suitable lines having one or more outlet openings through which the waste air is exhausted from the clean room and supply air is supplied to the room.

The installed ventilation device described so far functions as follows:

Via the waste air inlet 13, the waste air 32 is extracted from the room, whereby a portion is discharged toward the outside through the exhaust air duct 28 toward the outside. At the same time, a portion of the outside air 27 is admixed to the waste air flow passing through the exhaust air duct 28. The resultant supply air is supplied via the fan 49 to the room in a defined prespecified volume flow. The fan 49 sucks the air vertically through the inflow nozzle 51 out of the suction-side chamber 47 and blows the supply air into the pressure-side chamber 48. In doing so, the volume flow is constantly regulated by the control unit 68, preferably via a PI regulating circuit. The actual value of the differential pressure of the air flow passing the fan is detected, via the inflow nozzle 51 of the fan 49, as the differential pressure by means of the volume flow measuring device 52 and conveyed to the control unit 68. The control unit 68 mathematically converts the actual value of the differential pressure into an actual value of the volume flow and, in case of a deviation, determines the required rotational speed of the fan motor 54. Subsequently, said motor is continuously adjusted in order to maintain the prespecified volume flow of the supply air.

Furthermore the volume of the conditioned outside air supplied as fresh air to the ventilation device 1 is regulated via the volume flow regulator 36 for the outside air duct 22. The nominal value for achieving the desired air volume or outside air is output as a continuous control signal by the control device 68 to the actuator 39. The measurement of the actual value of the differential pressure in the outside air duct 22 is accomplished via the measuring cross 41 installed there. The selected nominal value of the outside air volume is preferably different, but constant, as a function of the operating mode in the clean room, e.g., during production, in standby mode, etc.

The volume of exhaust air extracted from the room is regulated via the volume flow regulator 37 for the exhaust air duct 28. The nominal value for the exhaust air volume is output as a continuous control signal by the control unit 68 to the actuator 43. The measurement of the actual value takes place via the measuring cross 44 installed in the exhaust air duct 28. The nominal value of the exhaust air volume to be discharged is different, but however constant, depending on the operating mode, during production, in standby mode, etc.

The room temperature is conditioned via the heat exchanger 57. The servo drive 66 of the regulating valve 64 for the heat transfer medium in the forward flow pipe 58 is continuously energized by the control unit 68 via a temperature regulating circuit, preferably a PI regulating circuit. The actual value of the temperature is detected by means of the room air temperature feeler 67 in the suction-side chamber 47 of the device 1.

Consequently, a universal, compact ventilation device 1 is provided, said device being capable of producing and maintaining essentially all the necessary guaranteed values for clean rooms of various purity classes. The device 1 comprises all the components necessary therefor in a space-saving and flow-enhancing arrangement, including means for the regulated admixing of outside air to the supply air, while, at the same time, there is a regulated discharge of room air as exhaust air.

With the ventilation device 1, internal thermal loads are discharged from the clean room while, at the same time the selected room temperature is controlled, monitored and regulated. Furthermore, the processed outside air for the fresh air supply of people in the clean room or as replacement for optionally existing process air is supplied and admixed. The air volume of the admixed outside air can be electronically variably adjusted and can be changed in one exemplary embodiment within a range of 50 to 2000 m3/h. The exhaust air volume flow is also electronically variably adjustable, thus allowing a simple adjustment of the pressure conditions in clean rooms. Due to the inventive device and arrangement of the outside air outlets 23 and the exhaust air inlet 29, it is possible to effectively avoid short-circuiting of the flows of the outside air and the exhaust air.

It is also possible to install a pressure sensor in or outside the ventilation device 1 and, e.g., to communicatively connect said device, via the data interface 71, to a control unit 68, so that the control unit 68 can control and regulate precisely and continuously the qualified room pressure by regulation of the volume flows.

Suitable filters for suspended particles may be provided in order to remove particles, suspended matter and germs from the exhaust air and/or from the supply air. Such air filters may be installed directly at the waste air inlet 13 or the supply air outlet 14, at the inlet and outlet openings leading to the room, or at any point in between in a line. Due to the internal regulating circuits in the ventilation device 1, the respectively prespecified air volume for the outside air that is to be admixed, for the exhaust air that is to be discharged and for the supply air that is to be supplied is always kept constant, independent of the quality class and/or the degree of contamination of the air filters. The air volume can be varied within a wide range, e.g., from 0 to 6000 m3/h, adjustable, wherein the nominal air volume in one example is 4200 m3/h.

The control device may also comprise a logic component for monitoring the filter contamination of upstream or downstream particulate air filters. The degree of filter contamination can be determined in view of the measured pressure values, in particular also with the use of a pressure sensor installed in the clean room.

The control device may also comprise a logic component for lock control for personnel and/or material locks, including a logic component for reciprocal door locks, indicator lamp display, optional incorporation of access control, etc. The ventilation device 1 can be flexibly expanded. In particular, the ventilation device can be expanded by additional interfaces for the input and output of data, e.g., for a card reader, request buttons or the like.

In larger clean rooms, several ventilation devices 1 are used parallel. Via the data interface 71, the ventilation devices 1 can be connected to a central unit and be centrally managed. On principle, the number of devices is unlimited. Data from the individual ventilation devices 1 can be output to the central unit as well as to higher-level building automation systems. Corresponding communication protocols such as, e.g., a TCP communication protocol or the like can be easily integrated in the control unit 68.

The invention claimed is:

1. Ventilation device for supplying air to and extracting air from a clean room, comprising:
    a housing (2) defining an interior (12), in which are arranged:
    a passage duct (16) that extends from a waste air inlet (13) of the housing (2) for waste air (32) extracted from the room through the interior (12) of the housing to a supply air outlet (14) of the housing (2), said supply air outlet (14) being disposed for supplying supply air (34) to the room;
    a speed controllable rotatable fan (49) arranged in the passage duct (16) in order to convey air from a suction-side chamber (47) fluidically connected to the waste air inlet (13) to a pressure-side chamber (48) fluidically connected to the supply air outlet (14);
    an outside air duct (22) that is fluidically connected to an outside air connection (19) provided on the housing (2) in order to receive outside air (27), said outside air duct (22) having an outside air outlet (23) in order to emit outside air into the passage duct (16), a first volume air flow regulator (36) in the outside air duct (22);
    an exhaust air duct (28) having an exhaust air inlet (29) fluidically connected to the passage duct (16) in order to receive a part of the waste air (32) discharged from the room as exhaust air (33), said exhaust air duct (28) having an exhaust air connection (21) provided on the housing (2) in order to convey the received exhaust air out of the housing (2) to the outside, a second volume air flow regulator (37) in the exhaust air duct (28);
    said outside air duct (22) and said exhaust air duct (28) being first and second pipes (17, 18), respectively, arranged adjacent the waste air inlet (13), said first and second pipes (17, 18) extending transversely through the passage duct (16) and oriented parallel to each other,
    said outside air outlet (23) being a first perforation (26) in the first pipe (17) forming the outside air duct (22), said exhaust air inlet (29) is a second perforation (31) in the second pipe (18) forming the exhaust air duct (28), said the first and the second perforations (26) extending over a circumferential ranges of the first pipe and the second pipe (17, 18), respectively, smaller than 180°, and said first and second perforations (26, 31) being oriented in opposite directions along the passage duct (16);
    said first and second volume air flow regulators (36, 37) being disposed inside the first and second pipe (17, 18), respectively; and
    a control unit (68) for controlling the operation of the first and second volume air flow regulators (36, 37) and the rotational speed of the fan (49).

2. The ventilation device of claim 1 in which said housing (2) has the shape of an elongated parallelepiped with an upper side (3), an underside (4), a first and a second longitudinal side (6, 7) that are opposite each other and connect the upper side (3) with the underside (4), and narrow opposing sides (8, 9) that are at least partially open so as to form the waste air inlet (13) and the supply air outlet (14), respectively, with the passage duct (16) extending between the narrow sides (8, 9) in a longitudinal direction of the housing (2).

3. The ventilation device of claim 1 in which the housing (2) comprises a load bearing frame structure (11) having metal and housing covers (3, 4, 6, 7, 8, 9) disposed to enclose and seal the interior (12) relative to the outside, and said covers (3, 4, 6, 7, 8, 9) being made of a material appropriate for application for clean rooms.

4. The ventilation device of claim 3 in which said housing covers (3, 4, 6, 7, 8, 9,) are made of compression molded layered panels.

5. The ventilation device of claim 1 in which an inflow nozzle (51) of said fan (49) is centrally mounted in a dividing wall (46) that extends transversely to the passage duct (16) and separates the suction-side chamber (47) from the pressure-side chamber (48), said inflow nozzle (51) oriented so as to receive flow (24) of the inflowing waste air through the waste air inlet.

6. The ventilation device of claim 1 in which said fan (49) has a speed-controlled drive (54) operationally connected to the control unit (68).

7. The ventilation device of claim 6 in which said fan (49) has a measuring unit (52) for measuring a value characterizing the volume air flow conveyed through the fan (49), said measuring unit (52) communicating with said control unit (68).

8. The ventilation device of claim 1 in which said outside air outlet (23) and said exhaust air inlet (29) are arranged in such that with the extraction of room air as exhaust air (33), outside air (27) can be simultaneously mixed with the waste air without short-circuiting of the air flows (27, 33).

9. The ventilation device of claim 1 in which each of the first and the second volume flow regulators (36, 37) comprises an adjustable butterfly valve (38, 42) in the respective outside air duct (22) and the exhaust air duct (28) for throttling the volume flow in said duct, respective actuators (39, 43) for actuating the butterfly valves (38, 42), said actuators (39, 43) being operationally coupled with the control unit (68) in order to receive actuating signals from said control unit, and differential pressure sensors (41, 44)

for respectively detecting a differential pressure characterizing a respective volume flow in each of said outside air duct (22) and exhaust air duct (28) and for transmitting respective detected measured values to the control unit (68).

10. The ventilation device of claim 1 including a cooling/heating unit (56) for thermally treating the supply air (34), said cooling/heating unit (56) being arranged in the passage duct (16) downstream of said fan (49).

11. The ventilation device of claim 10 in which said cooling/heating unit (56) comprises a heat exchanger (57) for cooling/heating with a liquid heat transfer medium, said heat exchanger (57) being connected to a forward and return flow connection (61) on the housing (2), a regulating valve (64) for regulating the flow of the heat transfer medium, and an actuator (66) that can be energized by the control unit (68) for setting the regulating valve (64).

12. The ventilation device of claim 11 including a temperature senser (67) in the passage duct (16) for detecting the temperature of the waste air and reporting it to the control unit (68), said control unit (6) comprising a logic control for energizing the actuator (66) of the regulating valve (64) based on the detected measured temperature values for regulating the room temperature.

13. The ventilation device of claim 1 including a data interface (71) for inputting nominal parameter values for the control unit (68), said values including at least the nominal values for the volume flow of the supply air, room temperature, outside air volume to admixed, and exhaust air volume to be discharged.

14. The ventilation device of claim 13 in which said data interface (71) further inputs parameter values of room pressure.

15. The ventilation device of claim 1 including filters for filtering the extracted waste air and the supplied supply air.

* * * * *